H. C. CLOYD.
PLOW.
No. 103,982.  Patented June 7, 1870.
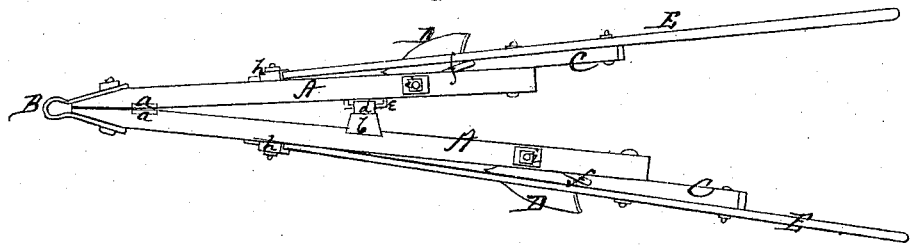
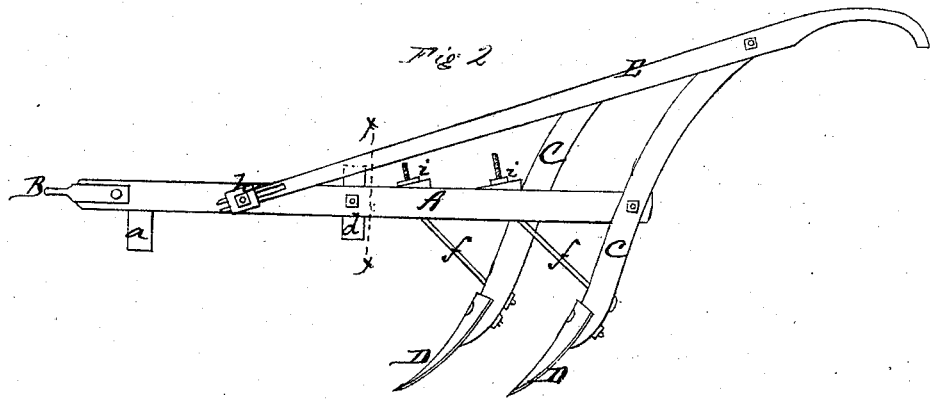
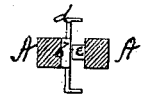
Witnesses.
Harry King,
C. L. Ouert.
Inventor,
Henry C. Cloyd
per
Alexander Mason
Attys.

UNITED STATES PATENT OFFICE.

HENRY C. CLOYD, OF WEST ALEXANDRIA, OHIO.

IMPROVEMENT IN PLOWS.

Specification forming part of Letters Patent No. 103,982, dated June 7, 1870.

*To all whom it may concern:*

Be it known that I, HENRY C. CLOYD, of West Alexandria, in the county of Preble, and in the State of Ohio, have invented certain new and useful Improvements in Plows; and I do hereby declare that the following is a full, clear, and exact description thereof, reference being had to the accompanying drawings, and to the letters of reference marked thereon, making a part of this specification.

The nature of my invention consists in the construction of a plow, as will be hereinafter fully set forth.

In order to enable others skilled in the art to which my invention appertains to make and use the same, I will now proceed to describe its construction and operation, referring to the annexed drawings, in which—

Figure 1 is a plan view, and Fig. 2 a side elevation, of my plow. Fig. 3 is a transverse vertical section of the two plow-beams through line $x\ x$, Fig. 2.

A A represent two plow-beams of unequal length, which are beveled on both sides at their front ends, and joined together, as shown in Fig. 1, by a bolt passing through them, said bolt passing through the ends of the clevis B, which embraces the front ends of the plow-beams. Immediately in rear of the pivot-point, on the inside of the plow-beams A A, are inserted metal bars $a\ a$, which bear closely against each other, the plow-beams thus having an up-and-down motion. By this arrangement the plows are kept at the same depth in the earth, whether the horse walks on the one side or the other of the row of corn, &c., or when plowing on a side hill or in turning, and at all times when the plows are moving.

At a suitable point on the inner side of one of the plow-beams A is inserted or otherwise secured a block, $b$, having a vertical metal bar, $d$, attached to it, the ends of said bar being bent at right angles toward the other plow-beam. Directly opposite this bar, on the inside of the other plow-beam, is placed a block, $e$, which is shod with metal, and against which the metal bar $d$ bears. This serves as a guide to prevent the plow-beams from separating too far as the bent ends of the bar $d$ strike the block $e$ on its upper and lower sides.

Near the rear ends, on the outer sides of the plow-beams, are pivoted the plow-shanks $c\ c$, which extend a suitable distance above and below the plow-beams. To the lower end of each plow-shank is attached the plow D, and the shank is braced by a rod, $f$, passing through the same above the plow, and then up through the plow-beam, and is secured by a nut, $i$, as shown in Fig. 2.

At the upper end of each plow-shank $c$ is secured the handle E by a bolt and nut, and the front or lower end of the handle is forked and inserted in a loop or box, $h$, secured on the outside of the plow-beam, said box being secured by a bolt which passes up in the fork of the handle when the same is inserted.

It will readily be seen by this arrangement that the handles are adjustable, and the rods $f f$ regulate the depth of the plows by moving the taps or nuts $i\ i$ on the upper sides of the beams.

Having thus fully described my invention, what I claim as new, and desire to secure by Letters Patent, is—

1. The arrangement of the shanks C C, rods $f f$, and nuts $i\ i$ with the plow-beams A A and handles E E, connected by the boxes $h\ h$ through the slotted ends of the handles, all constructed substantially as set forth.

2. The arrangement of the beams A A, clevis B, shanks C C, plows D D, handles E E, guides $a\ a$ and $d\ e$, rods $f f$, nuts $i\ i$, and boxes $h\ h$, all constructed substantially as and for the purposes herein set forth.

In testimony that I claim the foregoing I have hereunto set my hand and seal this 15th day of February, 1870.

HENRY C. CLOYD. [L. S.]

Witnesses:
JOHN V. CAMPBELL,
ROBERT W. QUINN.